United States Patent [19]

DeSalve

[11] 4,285,632
[45] Aug. 25, 1981

[54] OILING SYSTEM FOR ROTOR BEARINGS

[75] Inventor: Dennis W. DeSalve, Findlay, Ohio

[73] Assignee: United Aircraft Products, Inc., Dayton, Ohio

[21] Appl. No.: 16,112

[22] Filed: Feb. 28, 1979

[51] Int. Cl.³ .................. F01D 25/18; F04D 29/06; F01M 9/00

[52] U.S. Cl. .................. 415/175; 184/6.11; 184/64; 308/78

[58] Field of Search .......... 415/175, 110, 111; 184/6.11, 7 R, 26, 31, 64; 308/76, 78, 82, 87 R, 99, 102, 104, 106, 107, 111, 122, 123, 168, 171, 187, 240

[56] References Cited

U.S. PATENT DOCUMENTS

| 1,427,150 | 8/1922 | Coppus | 415/175 |
| 2,702,215 | 2/1955 | Diefenderfer | 184/64 X |
| 3,004,806 | 10/1961 | Schinnerer | 184/6.11 X |
| 3,056,634 | 10/1962 | Woollenweber, Jr. et al. | 308/78 |
| 3,094,271 | 6/1963 | Greenwald | 184/64 X |
| 3,394,875 | 7/1968 | Hasa et al. | 415/175 |
| 4,073,596 | 2/1978 | Erickson et al. | 415/175 |

FOREIGN PATENT DOCUMENTS

| 584269 | 10/1958 | Italy | 184/6.11 |
| 766531 | 1/1957 | United Kingdom | 184/6.11 |
| 557194 | 3/1975 | U.S.S.R. | 184/6.11 |

Primary Examiner—Stanley N. Gilreath
Attorney, Agent, or Firm—J. E. Beringer

[57] ABSTRACT

An oiling system in turbo and like machinery providing cooling, lubricating and fluidized damping functions. A rotor shaft operates in connection with a reservoir of lubricating oil, and with a lubricant supply mechanism, to supply oil to the shaft bearings in an amount properly to cool and to lubricate shaft bearings despite adverse effects of high speed, relatively high temperature operation. At the same time, and along paths of flow leading to and through the shaft bearings, oil films are established and maintained damping attempted vibratory and like dynamic behavior in the rotor shaft.

8 Claims, 5 Drawing Figures

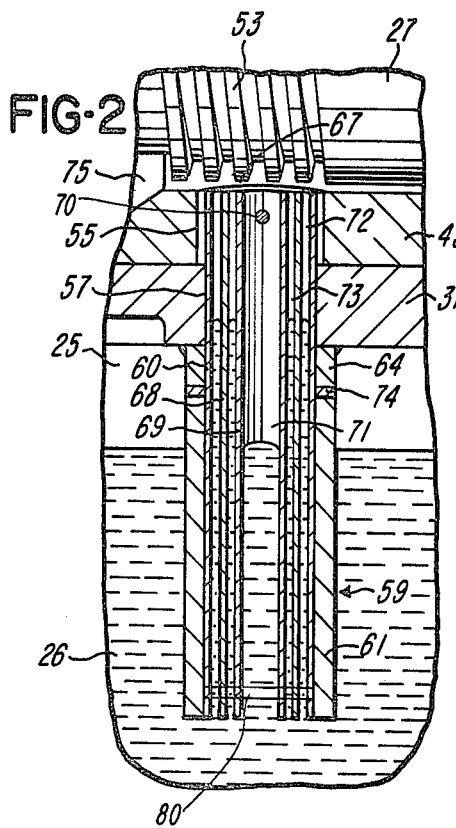
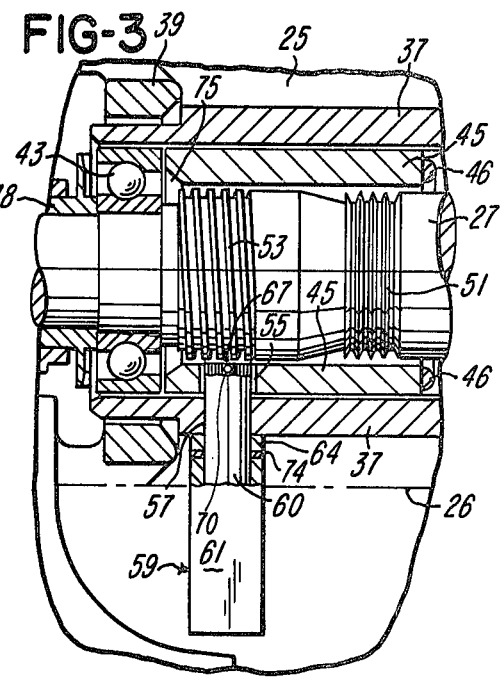
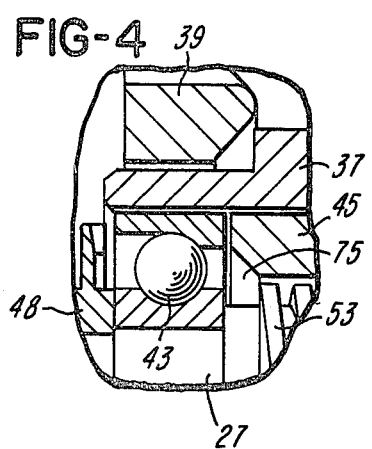
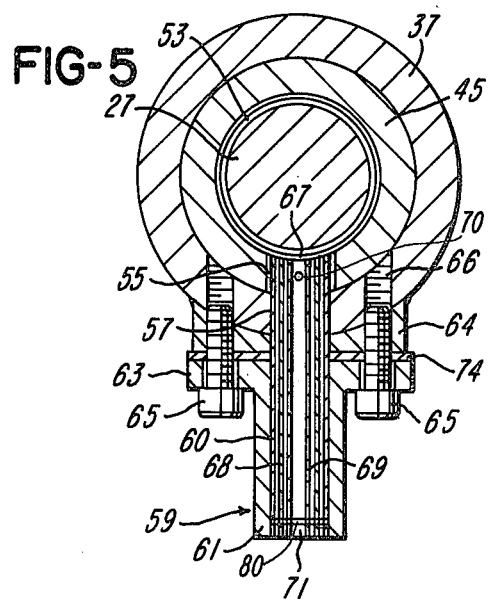

OILING SYSTEM FOR ROTOR BEARINGS

BACKGROUND OF THE INVENTION

This invention relates to oiling systems, and especially to oiling systems as used in rotor assemblies, for example rotor assemblies of air cycle machines. Oiling requirements are relatively severe in connection with the bearings of a rotor shaft of turbomachinery. Lubrication requirements are relatively easily met and can survive lack of uniformity in oil flow and reductions in supply. It has become increasingly apparent, however, that the shaft bearings are repositories of heat coming from external and internal sources, which heat is best dissipated by maintaining a full, generous flow of oil through the bearings. In the prior art, oil has been supplied by wicking devices which provide a movement of oil sufficient for lubrication purposes but totally inadequate to proper cooling. A use of capillary means to start or to prime an inherent pumping system has been proposed. Results, however, have been inconsistent, particularly at relatively high oil temperatures, due at least in part to a concept of structure which brings capillary devices as close as possible to the rotor shaft. A use of separate oiling pumps and the like has been suggested but this is a relatively costly recourse which may be impractical for structural reasons.

A high speed rotor shaft is inherently subject to vibrating and gyrating influences which can become sufficiently severe to lead to damage and malfunction of the rotor system. It has heretofore been sought to avoid or to minimize such influences by constructing the rotor assembly with such high degree of precision that movements of the rotor are very closely confined and controlled by mechanical means. Obviously this has involved relatively costly and skilled machining and assembly procedures.

Insofar as is known, these problems of the prior art have not been adequately dealt with heretofore. Practices as described in the foregoing constitute the closest, most pertinent known prior art.

SUMMARY OF THE INVENTION

A rotor assembly according to the illustrated embodiment of the invention incorporates a screw pump in the rotor shaft, with oil being lifted to the shaft by capillary means, an initial flow of oil being used to prime a main flow path capable of applying oil to the shaft bearings in amounts sufficient for cooling as well as for lubrication. The capillary means and a tube defining the main oil supply connection are comprised in a unitary device which instead of being brought more closely to the rotor shaft is moved appreciably in an opposite sense to create a distinct gap therebetween. Unexpectedly, such repositioning increases the ability of the pumping system to supply a full, generous flow of oil to the bearings under all conditions of operation. Such flow fills passages leading to and through the bearings. Oil effectively trapped in the relatively small clearances which define the flow passages provides a fluidized damping of the rotor system.

An object of the invention is to provide an oiling system in turbomachinery or the like characterized substantially as indicated in the foregoing.

Other objects and structural details of the invention will more clearly appear from the following description when read in connection with the accompanying drawings, wherein:

FIG. 2 is a detail enlarged view of a capillary assembly and its relation to the screw pump;

FIG. 3 is a detail, partly diagrammatic view of an oiling system illustrating the concept of fluidized damping;

FIG. 4 is a detail, enlarged view illustrating the cantilevered arrangement of the rotor shaft and its mounting cartridge; and FIG. 5 is a fragmentary view in cross section, taken substantially along the line 5—5 of FIG. 1.

Figure 1:
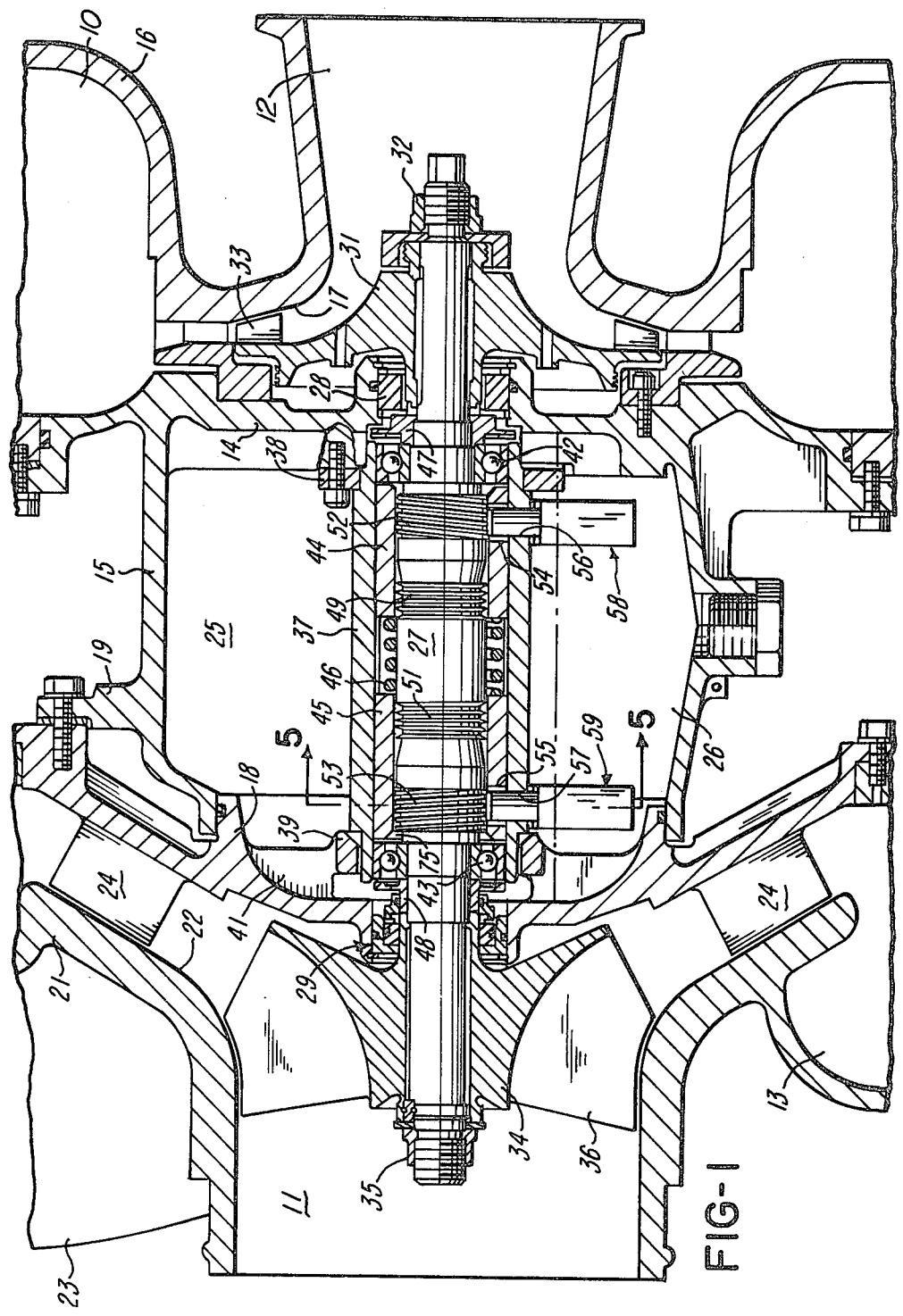
FIG. 1 is a view in cross section of a rotor assembly constructed in accordance with concepts of this invention.

Referring to the drawings, the invention has particular though not limited reference to air cycle machines, and, for convenience of disclosure is shown as embodied in such a machine. It will be understood, however, that oiling concepts of the invention are widely applicable to machines using high speed rotors mounted in bearings that require lubrication and cooling.

As seen in FIG. 1, a rotor assembly of an air cycle machine provides, at opposite ends thereof, an annular inlet 10 for a compressed air or gas and an inlet 11 for a lower pressure, lower temperature air or gas, for example air drawn from ambient surroundings. The inlets 10 and 11 are part of a segmented housing structure which further forms an outlet 12 generally concentric with annular inlet 10 and a volute chamber 13 in generally surrounding relation to inlet 11. An understanding of details of construction of the segmented housing is not important to an understanding of the present invention. Housing details will accordingly be only briefly considered.

Forming the housing, a vertical wall 14 projects a generally cylindrical skirt 15 therefrom. Bolted to the wall 14, and projecting in a sense oppositely of skirt 15, is a configured segment 16 which forms the inlet 10 and the outlet 12, along with a generally radial passage 17 leading from the annular inlet to the outlet.

At its outer end, skirt 15 receives a flanged portion of a diffuser plate 18. A peripheral portion of plate 18 extends radially beyond skirt 15 and is bolted to a flange 19 thereon. Also bolted to a peripheral portion of plate 18 is a configured segmental housing portion 21 which forms inlet 11, volute chamber 13, and an intecommunicating pasage 22. The segmental housing portion 21 includes also an outlet 23 from the volute chamber 13. The plate 18 has diffuser blades 24 positioning in passage 22. The diffuser plate 18 effectively closes the outer end of skirt 15 and defines with the skirt and with vertical wall 14 an interior chamber 25. A body of oil 26 is contained in a lower part of the chamber 25.

A rotor shaft 27 intersects the chamber 25, and, at its opposite ends, projects through shaft seals 28 and 29 positioned in coaxial openings in the wall 14 and in diffuser plate 18 respectively. A turbine wheel 31 is keyed to that end of shaft 27 projecting through and beyond seal 28. It is held in position on the shaft by means including a nut 32. The turbine wheel 31 has blades 33 positioning in flow passage 17. In somewhat similar manner, that end of shaft 27 which projects through and beyond seal 29 has a blower wheel 34 keyed thereto, held in place on the shaft by means including a nut 35. Blower wheel 34 has blades 36 positioning in passage 22. Operational and functional concepts of an air cycle machine are well known. Briefly, an air or gas under pressure admitted to the rotor assembly at inlet 10 expands through passage 17 into outlet 12. In the process, a large part of its energy is consumed in acting upon blades 33 to initiate a relatively high speed rotary motion of turbine wheel 31 and of the shaft 27 to which it is attached. With its heat energy largely dissipated, the now relatively cool air discharges generally axially from outlet 12 to a place of use. The rotary motion of shaft 27 causes blower wheel 34 to rotate. This motion of the blower wheel draws air from ambient surroundings into the rotor assembly by way of inlet 11 and directs it under conditions of increasing pressure and temperature into volute 13 for ultimate discharge by way of outlet 23. Diffusers 24 assist in obtaining a directed, controlled flow of air into the volute portion.

A cylindrical member 37, which for convenience of description is termed a cartridge, is in a surrounding, supporting relation to the rotor shaft 27 in chamber 25. At one end thereof, the cartridge 37 has an external collar 38 fixed thereto by which the cartridge is bolted to a raised portion of vertical housing wall 14. From the housing wall 14, the cartridge 37 extends freely outwardly into chamber 25 in cantilever fashion. An opposite or outer end thereof is reduced in diameter and positions centrally of a hub 39 formed integrally with spider means 41 projecting from the diffuser plate 18. As indicated, the cartridge 37 is separated by a gap from hub 39 so that the mounting of the cartridge is one of true cantilever form, the cartridge being positively supported at only one end, namely that end fixed to housing wall 14. At one end of the cartridge 37, interiorly thereof, is a rolling bearing 42, and similarly positioned within the cartridge at the opposite end thereof is a like rolling bearing 43. A sleeve member 44 is mounted within the cartridge 37 in a position to abut bearing 42. A like sleeve 45 is in cartridge 37 and longitudinally spaced from sleeve 44 in position to abut bearing 43. A compression spring 46 positions between the sleeves 44 and 45 and urges them in a separating relation or in a direction to abut respective bearings 42 and 43. A centrifugal pump or runner 47 is effectively clamped between an inner end of turbine wheel 31 and the inner race of bearing 42. A similar centrifugal pump runner 48 is similarly clamped between an inner end of the blower wheel 34 and the inner race of bearing 43. The sleeves 44 and 45 are relatively closely received in cartridge 37 and relatively closely surround rotor shaft 27. In each instance, however, there is sufficient clearance for a movement of oil along the shaft 27 and between the sleeves and cartridge toward the respective bearings 42 and 43. The shaft 27 on its periphery is formed with spaced apart labryinth seals 49 and 51. They are additionally formed with peripheral screw formations 52 and 53 operative as screw pumps. The screw pump 52 positions opposite an aperture 54 in the sleeve 44 while screw pump 53 positions opposite an aperture 55 in sleeve 45. Sleeve aperture 54 in turn aligns with an opening 56 in cartridge 37 while aperture 55 aligns with cartridge opening 57. The aligning apertures in the sleeves 44-45 and the cartridge 37 provide for the installation of oil capillary and feed devices 58 and 59 respectively. The devices 58 and 59 are identical so that a description of one will suffice for both, it being observed that the devices are associated with respective screw pumps 52 and 53. Thus, and referring particularly to FIG. 5, the device 59 includes a tubular body 61 in which is installed concentric tubes 60, 68 and 69 (see also FIG. 2). The body 61 positions against a saddle member 64 fixed to and conforming to the curved underside of cartridge 37. Bolts 65 project through the oppositely directed ears 63 on the body 61 and through the saddle member 64 into tapped openings 66 and provide a means to fix the capillary-feed device 59 to the underside of the cartridge. At upper or outer ends thereof, the assembly of tubes 60, 68 and 69 projects above and beyond body 61 to terminate in an adjacent relation to the screw pump formation 53 on shaft 27. In accordance with concepts of the present invention, the gap separating the extremity of the tube assembly, which gap is indicated at 67, is made relatively wide, to have a dimension on the order of 0.050 inches. Concentric tubes 60, 68 and 69 are progressively smaller in diameter. Innermost tube 69 has a relatively wide inside diameter and provide a full flow oil passage 71. The spacing between tubes 69 and 68 and the spacing between tube 68 and tube 60 are relatively small and constitute capillary flow passages 72 and 73. The tubes 60, 68 and 69 are nested within one another and within the body 61 and are interconnected in a unitary arrangement in any appropriate manner, as by transverse intersecting pins 70 and 80. Further, the tubes 60, 68 and 69 are substantially coextensive in length. The capillary flow passages 72 and 73 and the oil feed passage 71 accordingly terminate at a substantially common plane adjacent to shaft 27. If desired, the outer extremities of the nested tubes may be given a concave configuration conforming substantially to the circular outline of the adjacent shaft 27. The device 59, with its accommodated tube assembly, has a length to extend into the body of oil 26. At their lower ends, therefore, the passages 71-73 communicate with the contained oil supply. Under non-operating conditions, substantially as shown in FIG. 2, the oil rises in passages 72 and 73 above the normal oil level, in a generally approaching relation to upper or outer extremities of the passages. The oil in feed passage 71 is at this time at a relatively lower level corresponding approximately to the level of the contained body of oil 26.

As the shaft 27 is put into rotation, an immediate effect is to raise the level of oil in the capillary passages 72 and 73, allowing it to enter upon the screw pump 53. The oil so acted upon may be driven by the screw pump longitudinally along the shaft 27 to the bearing 43. The capillary flow to the screw formation 53 may also be regarded as having a priming function, in that it assists the pump in lifting the oil in feed passage 71 above the oil level in the sump and establishing a free flow through the passage 71 from the sump to the pump 53. The pump 53 accordingly has access to and generates a relatively large volume flow of oil from the sump to the bearing. The oil flows to and through the bearing and exits beyond the bearing into the chamber 25 to descend again into the body of oil 26. The centrifugal runner 48 operates in conjunction with the shaft 27 and assists the pump 53 in pulling oil through the bearing 43 and returning it to the sump. The full flow of oil is continuous throughout operation of the shaft 27 and insures adequate cooling of the bearing, as well as lubrication thereof.

Returning to a consideration of FIG. 5, it will be observed that ears 63 attach to saddle member 64 through an intermediate shim or spacing member 74. In this manner, the dimension of gap 67 may be closely predetermined and held at a selected value. In this connection, it will be understood that the invention deals with an unexpected physical problem in operation of the rotor assembly. Thus, it would seem to be expected that in selecting a space relationship between the device 59 and the shaft 27 the device should be brought as closely as possible to the shaft or as close as clearance considerations would allow. It has been determined, however, that under some conditions of operation, notably when the oil temperature is relatively high, that there is a shear effect at the separating gap between the capillary-feed device and the screw pump whereby a primed pump exerts a positive pressure in the area over the feed tube 71, or at least a negative pressure inconsistent in its ability to lift oil through the tube to the pump. When this occurs, there is a low or non-uniform flow of oil to the bearing inadequate for proper cooling. In accordance with the instant invention it has been determined that a better, more successful flow of oil to the pump can be established and maintained by moving the capillary-feed device not closer to the pump but more distant therefrom. Accordingly, the capillary-feed device has been backed away from the shaft 27 to create a substantially wider gap which may, as noted, be on the order of 0.050 inches. While a gap of this latter size has been found to overcome problems associated with shear effects at the screw pump, it may be that gaps of other dimension may serve equally as well, within the general objective of removing the capillary-feed device far enough from the screw pump to obviate misoperation resulting from shear effects.

It will be understood that the operations described in connection with capillary-feed device 59 and the pump 53 which it supplies occur also with respect to capillary-feed device 58 and its supplied pump 52 which furnish oil to the bearing 42. The centrifugal runner 47 operates in the same manner as runner 48 to assist in drawing oil through the bearing 42 and returning it to the sump reservoir. In operation, the rotor shaft 27 comes under the influence of forces producing a dynamic response in the shaft which can take the form of vibrating and gyrating actions. Since it may be impractical to provide a design in which no such dynamic responses can occur, it is frequently proposed to introduce special materials and construction techniques to provide adequate damping to the rotor system. These add to the cost of the system and, moreover, may have a limited useful life and reliability. The instant invention obviates prior art requirements and techniques in that it utilizes the full, generous flow of oil to and through the bearings to accomplish an inherent fluidized damping. Controlled clearances are established and maintained between the rotating and stationary components. This establishes flow passages which result in rotating parts being completely enveloped by a viscous fluid. Fluidized damping is the inherent result. Among the clearances which provide fluidized flow passages is the clearance between sleeves 44-45 and shaft 27 and clearances between the sleeves 44-45 and the cartridge 37. It will be understood that the oil in the process of being pumped to the bearings 42 and 43 fills all communicating spaces and migrates to a position between the sleeves and the cartridge. Immediately beyond each pump 52 and 53 and in advance of its respective bearing the structure provides an annular chamber 75. Oil fills this chamber and under the pressure exerted by the pump is forced through the bearing and into all communicating passages and clearances. The concept is partly diagrammatically illustrated in FIG. 3 where it can be seen that a cushion of oil positions at all points critical to effective damping of the rotor system.

The embodiment of the invention disclosed herein lends itself to modification and substitution of parts in ways that are believed obvious. These and other variations in invention embodiments are regarded as being embraced by invention concepts.

What is claimed is:

1. In a rotor assembly, a housing providing an oil sump, a cartridge substantially bridging said sump, a rotor shaft rotatable in said cartridge and having integral screw threads thereon forming a pump means, flow passage means defining a capillary means for lifting oil from said sump to said shaft to prime said pump means, other flow passage means defining an oil feed means through which a full flow of oil is lifted to said shaft by operation of a primed pump means, said capillary means and said oil feed means being part of a unitary assembly extending through said cartridge to an adjacent relation to said pump means on said shaft, said unitary assembly being so positioned relative to said shaft as to create therewith a critical gap across which oil moves directly from said assembly on to the screw threads on said shaft, the width of said gap being selected to compensate for shear effects associated with shaft operation at relatively high oil temperatures, and shaft bearing means to and through which oil flows along said shaft in response to operation of said pump means.

2. In a rotor assembly, a housing providing an oil sump, a rotor shaft rotatable in said housing and having integral screw threads thereon forming a pump means, capillary means for lifting oil from said sump to said shaft to prime said pump means, oil feed means through which a full flow of oil is lifted to said shaft by operation of a primed pump means, said capillary means and said oil feed means being part of a unitary assembly so positioned relative to said shaft as to create a critical gap therebetween compensating for shear effects associated with shaft operation at relatively high oil temperatures, said unitary assembly comprising a plurality of concentric tubes positioning substantially radially of said rotor shaft with one end thereof submerged in the oil in the oil sump and the other end in an approaching spaced relation to said shaft, the spacing of said other end from said shaft defining said critical gap, and shaft bearing means to and through which oil flows along said shaft in response to operation of said pump means.

3. A rotor assembly according to claim 2, wherein said plurality of tubes includes an inner tube of relative wide diameter defining said oil feed means and at least one outer tube in a relatively closely spaced relation to said inner tube and defining therewith said capillary means.

4. A rotor assembly according to claim 3, wherein said rotor shaft intersects an interior housing chamber a part of which forms said oil sump, characterized by a cartridge member fixed at one end to a wall defining said interior chamber and projecting in substantially unsupported manner into said chamber in surrounding relation to said rotor shaft, said cartridge mounting said shaft bearing means and having said unitary oil feed and capillary assembly fixed thereto.

5. A rotor assembly according to claim 4, wherein said housing has a wall opposite said wall to which said cartridge member is fixed at one end, said opposite wall providing a fixed collar in surrounding relation to said cartridge at its opposite end, said collar being spaced from said cartridge to define a true cantilever mounting of said cartridge in said housing.

6. A rotor assembly according to claim 1, said shaft bearing means being in a longitudinally spaced relation to said screw pump means, characterized by sleeve means in said cartridge in a surrounding relation to said shaft in advance of said bearing means in the sense of flow of oil to said bearing means, clearances being established inside and outside said sleeve means flooded with oil in operation of said rotary shaft for a fluidized damping of vibratory motions thereof and said sleeve means being apertured and said unitary assembly projecting through an apertured portion thereof for a direct approach to said shaft.

7. A rotor assembly according to claim 1, characterized by means to select a position of said unitary assembly defining said critical gap.

8. A rotor assembly according to claim 7, said last named means including means to vary said critical gap.

* * * * *